United States Patent

[11] 3,593,596

| [72] | Inventors | Keith W. Race<br>Hagerstown, Md.;<br>Delbert E. Willis, deceased, late of<br>Hagerstown, Md. (by Marie E. Willis, executrix) |
|---|---|---|
| [21] | Appl. No | 885,233 |
| [22] | Filed | Dec. 15, 1969 |
| [45] | Patented | July 20, 1971 |
| [73] | Assignee | Mack Trucks, Inc.<br>Allentown, Pa. |

[54] POWER TRANSMISSION MECHANISM
16 Claims, 3 Drawing Figs.

[52] U.S. Cl. .................................................. 74/720,
74/331
[51] Int. Cl. .................................................. F16h 47/06,
F16h 3/08
[50] Field of Search .......................................... 74/720,
730, 718, 331

[56] References Cited
UNITED STATES PATENTS
2,093,042 9/1937 Fotlinger ..................... 74/730

| 3,270,587 | 9/1966 | Geray | 74/718 X |
| 3,285,100 | 11/1966 | Peltner et al. | 74/331 X |
| FOREIGN PATENTS | | | |
| 885,427 | 5/1943 | France | 74/720 |
| 1,227,256 | 3/1960 | France | 74/730 |
| 955,906 | 4/1964 | Great Britain | 74/720 |

Primary Examiner—Carlton R. Croyle
Assistant Examiner—Thomas C. Perry
Attorney—Brumbaugh, Graves, Donohue and Raymond ABSTRACT: A power transmission mechanism having mechanical and hydraulic drive paths comprising a pinion shaft drivingly connected to a plurality of countershafts and a hydraulic torque converter drivingly connected to each countershaft by a one-way clutch. The torque converters and the pinion shaft are disposed for selective engagement with an input shaft by means of clutches. In an alternative arrangement, a clutch selectively connects each converter rotor to its impeller and another clutch selectively grounds each converter stator to the transmission housing.

INVENTORS.
KEITH W. RACE &
DELBERT E. WILLIS
BY
their ATTORNEYS

3,593,596

POWER TRANSMISSION MECHANISM

BACKGROUND OF THE INVENTION

This invention relates to a power transmission mechanism having mechanical and hydraulic drive paths and utilizing a plurality of lightweight torque converters in a compact, efficient and inexpensive transmission arrangement.

Power transmission mechanisms that employ mechanical and hydraulic drive paths have been developed for use in trucks, buses and other vehicles which bear heavy loads. In such systems generally the mechanical or direct drive is utilized for increased efficiency at the higher vehicle speeds. For starting and other similar load conditions torque converters are known for use in the hydraulic power paths. In known mechanisms using a single torque converter for this purpose, the converter is necessarily relatively large and hence more expensive to manufacture and operate. Transmission bulkiness frequently results. In presently used transmissions in which several converters are driven independently from an input shaft, either a mechanical drive is not provided thus resulting in less efficiency at higher speeds or the converters cannot be operated simultaneously at a particular gear ratio thus necessitating the use of large converters with the resultant disadvantages of increased cost, size and weight.

SUMMARY OF THE INVENTION

There is provided, in accordance with the invention, a power transmission having mechanical and hydraulic drive paths which is more efficient and versatile, and more compact than previously known mechanisms. The transmission comprises a direct drive means connecting an input shaft to an output shaft in a mechanical power path and hydraulic torque converters each drivingly engaging one of a plurality of generally parallel countershafts in a hydraulic power path. Two clutches are utilized to selectively couple an input shaft with the converters and the pinion shaft, respectively. If both clutches are engaged, the converters function as retarders to assist in reducing vehicle speed. The power paths preferably include a change speed gear train to transmit drive through the countershafts to an output shaft. A one-way clutch permits each countershaft to overrun its converter. In an alternative embodiment, a small independent clutch connects each rotor to its impeller to provide a direct drive without need of a pinion shaft. A clutch is utilized to selectively ground the stator to the transmission housing for converter drive, or to release the stator during direct drive. Retardation can be effected by engaging both clutches.

DESCRIPTION OF THE DRAWINGS

For a better understanding of the invention, reference may be made to the following description of exemplary embodiments, and to the drawings, in which.

DESCRIPTION OF THE EXEMPLARY EMBODIMENTS

Figure 1:
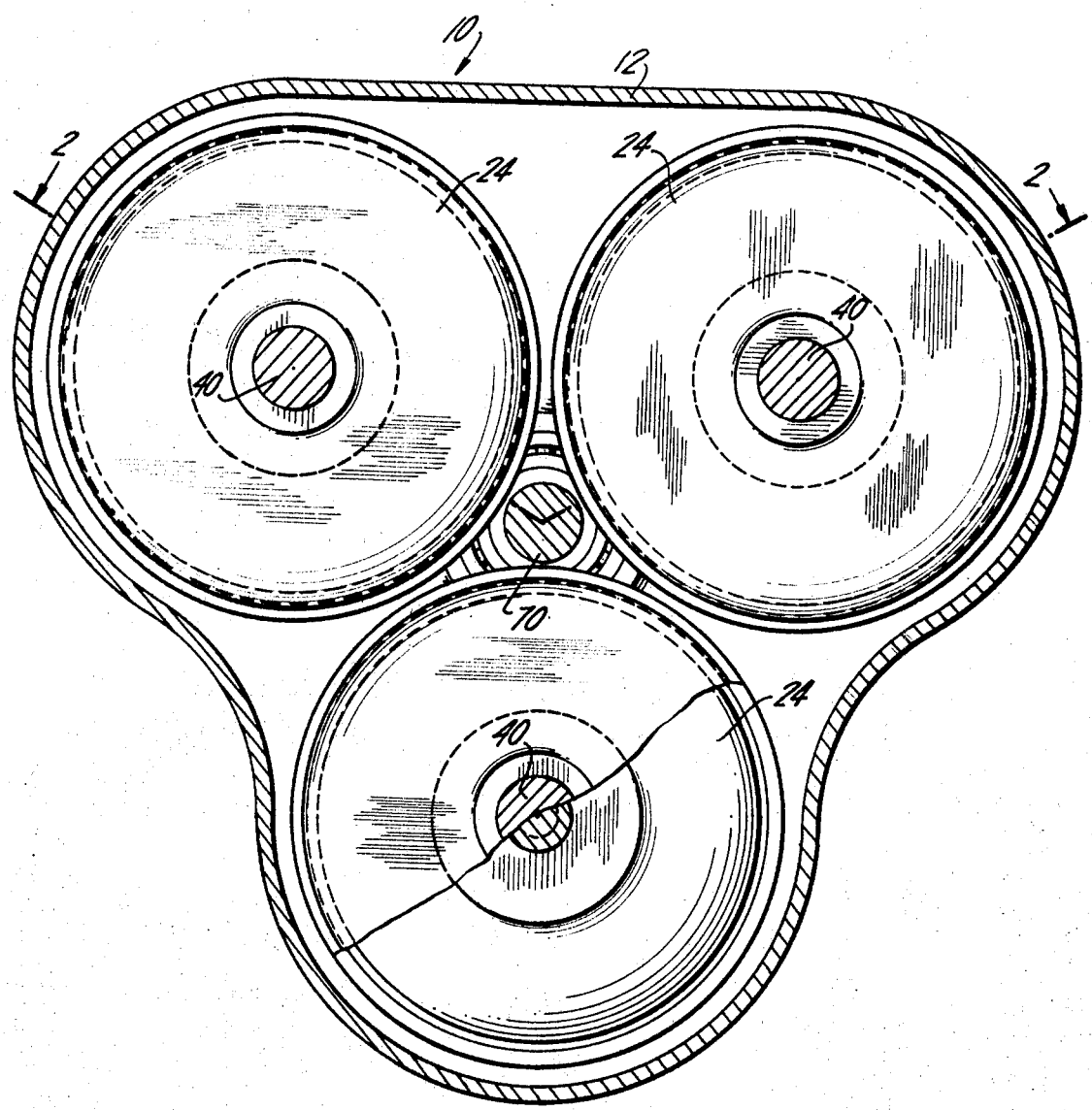
FIG. 1 is a vertical sectional view of a typical power transmission mechanism according to the present invention.
Figure 2:
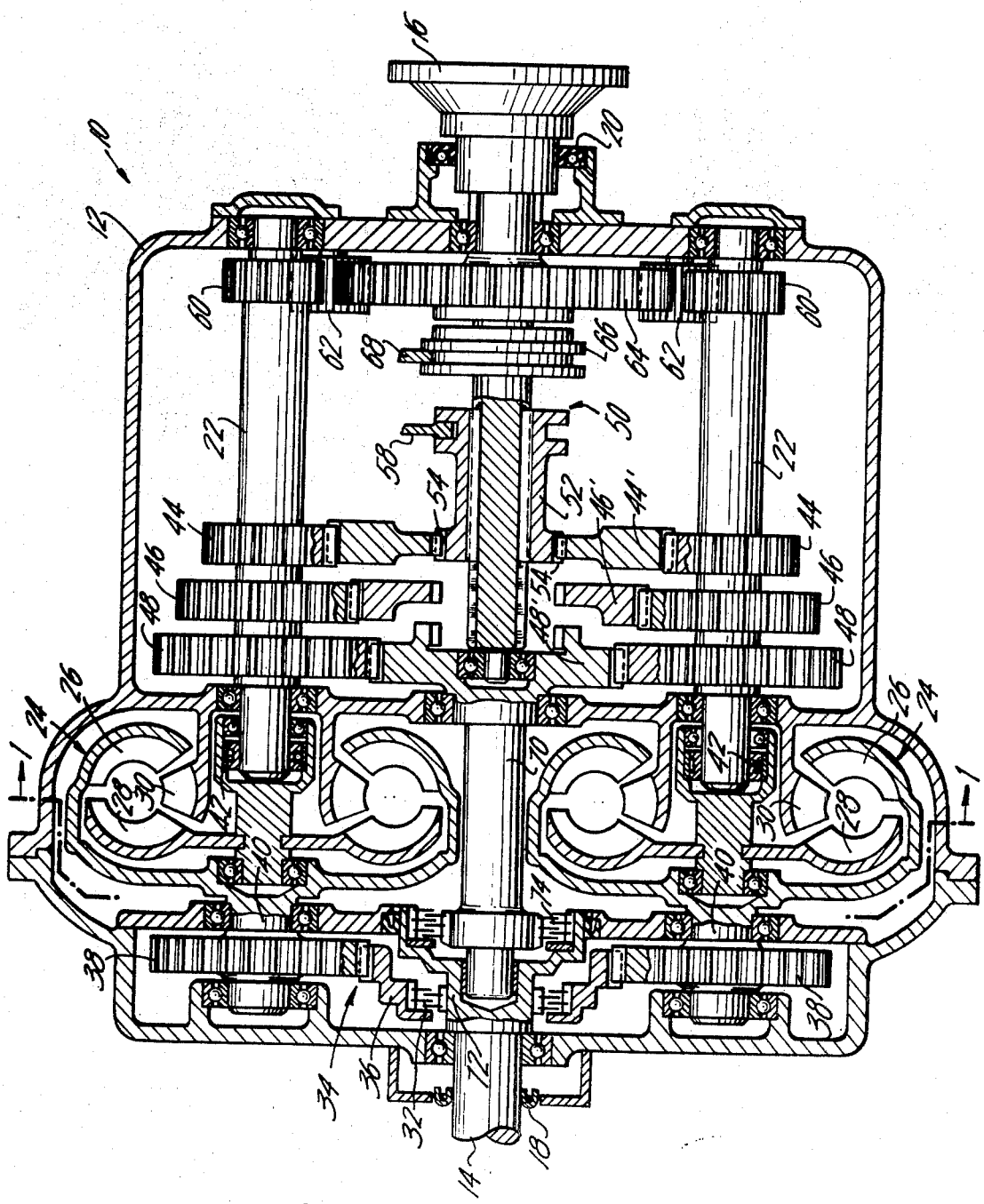
FIG. 2 is a longitudinal sectional view taken along the line 2-2 of FIG. 1.

As shown in FIGS. 1 and 2, a typical power transmission 10, according to the invention, includes a housing 12 in which there is journaled an input shaft 14 and a coaxial output shaft 16. The transmission is lubricated by splash from the sump oil, which has been omitted for clarity, a pair of oil seals 18 and 20 being positioned between the housing 12 and the shafts 14 and 16, respectively.

The transmission is provided with a plurality of countershafts 22 arranged, in generally parallel alignment with one another, about the central axis of the input and output shafts. A hydraulic torque converter 24 is mounted coaxially with each countershaft and includes an impeller 26, a rotor 28, and a stator 30. The stator 30 of each converter is permanently grounded to the housing 12. Means for drivingly engaging the input shaft with each torque converter include a clutch 32 for selectively coupling the input shaft to a gear train 34 having a driving gear 36 positioned coaxially with the input and in constant mesh with a driven gear 38 mounted on a hub 40 of the impeller 26 of each torque converter 24. The use here of a single gear 36 to drive several gears 38 assists in obtaining a desired compact, lightweight design. Power transmitted to the driven gears 38 causes rotation of the impellers 26 which, in the conventional fashion, move the rotors 28. Each of a plurality of one-way clutches 42 drivingly engages a converter rotor 28 with one of the countershafts 22. Means for drivingly engaging each countershaft 22 with the output shaft 16 include a gear train having a plurality of sets of gears 44, 44', 46, 46' and 48, 48' corresponding to the first, second, and third speed ratios, respectively, in the hydraulic drive path. The driving gearwheels 44, 46 and 48 are mounted on and coaxial with each countershaft and they are in constant mesh with the driven gearwheels 44', 46' and 48' positioned along an axis parallel to the countershafts. The use here of the single driven gearwheel to which power is transmitted from all of the countershafts at any given speed ratio furthers the compactness and simplicity of the design.

Ratio changing is accomplished by means of a conventional operator-controlled clutch 50 which is coaxial with the driven gears and which selectively couples the driven gears to the output shaft 16. The clutching mechanism 50 includes a slidable sleeve 52 splined to the output shaft 16 and having clutch teeth 54 for engaging the mating clutch teeth of the gears 44', 46' and 48'. Operation of the clutch 50 to select a desired speed ratio is accomplished by means of shifter rods (not shown) carrying a shifter fork 58 for engaging the sleeve 52. The shifter rods are actuated by a shift lever (also not shown) in accordance with standard practice, the lower end of this lever being formed with a shifter finger that engages notches in brackets carried by the respective shifter rods.

A reverse gear set is provided including a driving pinion 60 mounted on each countershaft 22 and in constant mesh with an idler pinion 62 which, in turn, is in constant mesh with a driven gear 64 mounted coaxially on output shaft 16. Coupling of gear 64 with the output shaft is obtained by means of a sliding clutch 66 which connects through a shifter fork 68 and a shifter rod (not shown) to the gear shift lever (also not shown) controlled by the operator.

To provide a mechanical power path, a direct drive means connects the input shaft 14 to the output shaft 16. The drive means include a pinion shaft 70 mounted between and coaxially with the input and output shafts. coaxially The pinion shaft 70 is received in a sleeve 72 of the end portion of the input shaft 14 and is selectively engaged with the input for direct drive by a clutch 74. The gearwheel 48' is driven by the shaft 70 on which it is carried coaxially. Thus, the same gear train is used for ratio changing in direct or mechanical drive as in hydraulic drive. Gearwheel 48' drives gearwheel 48 with which it is in constant mesh, causing the countershafts 22 to rotate. The one-way clutches 42 permit the countershafts to overrun the converters 24. The clutch 50 selectively couples the driven gearwheels 44' and 46' of the gear sets to the output shaft 16 for first and second mechanical speeds, respectively. For third mechanical speed, clutch 50 couples gearwheel 48' directly to the output 16. The reverse gear set 60, 62 and 64 is also available for use in either direct or hydraulic drive, clutch 66 being engaged as described above when this is desired.

The invention thus provides a selective dual drive path which permits a fluid drive through the torque converters or a direct, mechanical drive bypassing the converters. For hydraulic drive, clutch 32 is engaged and clutch 74 is disengaged. The gear set 34 enables the input load to be divided among the simultaneously operating converters. This permits the use of a relatively small, low-cost, high-production, automotive type of converter. The employment of three such converters makes the transmission especially suitable for heavy duty trucks. The ratio of the gearing 34 may be adjusted in order that an optimum pump speed for the converter may be obtained. This allows a further reduction in the required capacity and cost of the converters. For direct or mechanical drive, clutch 32 is disengaged and clutch 74 is engaged. Three forward speeds and a reverse speed are available in each power path. Converter drive is employed when increased torque is desired in starting or when the vehicle is otherwise under a heavy load. At other times, the direct drive is used for increased efficiency. The six forward speeds can be used in any possible combination. The operator may start the vehicle in converter first speed and then shift step by step through the two succeeding converter drive forward speeds and the three direct drive forward speeds, or he may omit one or more of the six speeds depending on the circumstances. Maximum flexibility is thus available. Since both the converters 24 and the direct drive gear set 48', 48 increase the countershaft torque, the remaining gear sets 44, 44' and 46, 46' by which torque is transmitted to the output 16 can be employed to provide various degrees of reduction.

The use of one-way clutches 42 to couple the converters to the countershafts permits the countershafts to overrun the converters when the vehicle is freewheeling and permits the use in direct drive of change speed gears 44, 46 and 48 carried on the countershafts thereby creating greater efficiency and allowing more compact transmission design. The stators 30 of the converters 24 are grounded permanently and directly to the housing 12. This, in combination with the other transmission features, presents an additional advantage over known heavy duty dual drive transmissions. When clutches 32 and 74 are applied simultaneously, the converters serve as retarders to assist in reducing speed of a vehicle. The degree of retardation may be variously altered by suitable gear ratios.

Figure 3:
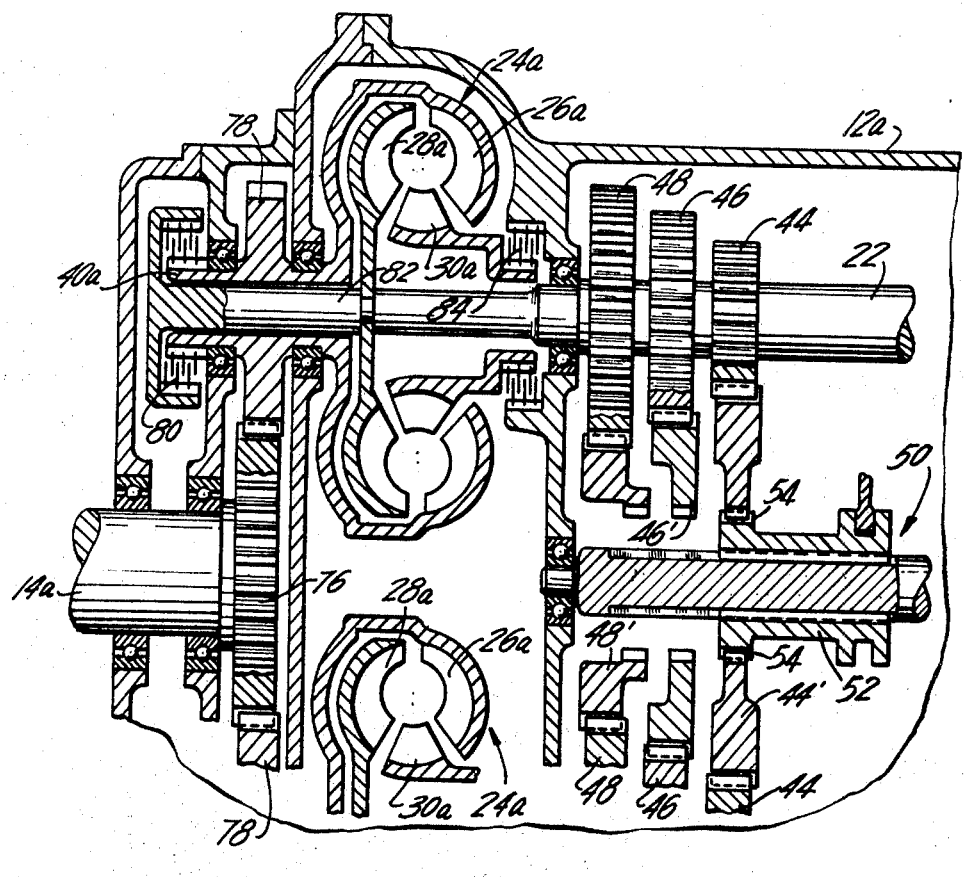
FIG. 3 is a fragmentary longitudinal sectional view, similar to FIG. 2, showing another embodiment of the invention.

FIG. 3 illustrates an alternative embodiment of the invention. Here an input shaft 14a engages the impellers 26a of torque converters 24a by means of a driving gearwheel 76 carried coaxially on the input and in constant mesh with driven gearwheels 78, each mounted on an impeller hub 40a. The direct or mechanical drive means include a clutch 80 to selectively engage a shaft 82 of each torque converter rotor 28a with the impeller 26a. The shafts 82 are positioned concentrically within the hollow impeller hubs 40a. The need for a pinion shaft is eliminated. A clutch 84 is used to selectively ground the converter stator 30a to the transmission housing 12a. Clutch 84 is normally engaged in converter drive and released when clutch 80 is engaged for direct drive. Retardation is effected by engaging both clutches 80 and 84 simultaneously.

For both embodiments, the clutches may be operated manually by switches in the vehicle cab, for example, the switches operating solenoid-actuated valves to control the flow of air under pressure for displacing the friction plates of the clutches, in accordance with techniques well known to the art. Thus, one switch could be operated to select fluid drive through the torque converters or direct mechanical drive, and another switch could be operated to effect retardation.

The embodiments of the invention described herein are illustrative only. Many variations and modifications may be made by one skilled in the art without departing from the spirit and scope of the invention. For example, any suitable clutch mechanism, either manual or automatic, may be employed for coupling the countershafts with the output shaft. All such variations and modifications, therefore, are included within the intended scope of the invention as defined by the appended claims.

We claim:

1. A power transmission mechanism comprising an input shaft, an output shaft, a direct drive means connecting the input shaft to the output shaft to provide a mechanical power path, a plurality of countershafts in generally parallel alignment with the direct drive means, a plurality of hydraulic torque converters, each mounted coaxially with and drivingly engaging a countershaft, means for drivingly engaging the input shaft with each torque converter, and means for drivingly engaging each countershaft with the output shaft in a hydraulic power path.

2. A power transmission mechanism according to claim 1 in which the direct drive means include a pinion shaft, a gear train to which drive is transmitted from the pinion shaft, and a clutch for selectively engaging gearwheels of the gear train to transmit drive to the output shaft.

3. A power transmission mechanism according to claim 1 in which the direct drive means include a pinion shaft, a clutch for selectively engaging the input shaft with the pinion shaft, a gear train to which drive is transmitted from the pinion shaft, and a clutch for selectively engaging gearwheels of the gear train to transmit drive to the output shaft.

4. A power transmission mechanism according to claim 3 in which the means for drivingly engaging each countershaft with the output shaft in a hydraulic power path include said gear train and said clutch for selectively engaging gearwheels of the gear train to transmit drive to the output shaft.

5. A power transmission mechanism according to claim 1 in which the direct drive means include a pinion shaft, a gear train having a driving gearwheel carried coaxially on the pinion shaft, a plurality of gearwheels carried on and coaxial with each countershaft, one such gearwheel on each countershaft in constant mesh with the pinion shaft driving gearwheel, and each remaining such gearwheel on each countershaft in constant mesh with a gearwheel on each countershaft in constant mesh with a gearwheel positioned coaxially with the pinion shaft, and a clutch for coupling the output shaft selectively to the gearwheels coaxial with the pinion shaft.

6. A power transmission mechanism according to claim 1 in which the direct drive means include a pinion shaft, a clutch for selectively engaging the input shaft with the pinion shaft, a gear train having a driving gearwheel carried coaxially on the pinion shaft, a plurality of gearwheels carried on and coaxial with each countershaft, one such gearwheel on each countershaft in constant mesh with the pinion shaft driving gearwheel, and each remaining such gearwheel on each countershaft in constant mesh with a gearwheel positioned coaxially with the pinion shaft, and a clutch for coupling the output shaft selectively with the gearwheels coaxial with the pinion shaft.

7. A power transmission mechanism according to claim 1 in which the means for drivingly engaging each countershaft with the output shaft in a hydraulic power path include a gear train to which drive is transmitted from the countershaft and a clutch for selectively engaging gearwheels of the gear train to transmit drive to the output shaft.

8. A power transmission mechanism according to claim 1 in which the means for drivingly engaging each countershaft with the output shaft in a hydraulic power path include a gear train having a plurality of driving gearwheels mounted on and coaxial with each countershaft and a plurality of driven gearwheels positioned along an axis parallel to the countershafts, each such driven gearwheel in constant mesh with a driving gearwheel of each countershaft, and a clutch positioned coaxially with the driven gearwheels for coupling the output shaft selectively to said driven gearwheels.

9. A power transmission mechanism according to claim 1 in which the means for drivingly engaging the input shaft with each torque converter include a clutch.

10. A power transmission mechanism according to claim 1 in which the means for drivingly engaging the input shaft with each torque converter include a gear train having a driving gear mounted coaxially with the input shaft and in constant mesh with a driven gear mounted on the impeller hub of each torque converter, and a clutch for selectively engaging the input shaft with the driving gear.

11. A power transmission mechanism according to claim 1, further comprising a plurality of one-way clutches, each for drivingly engaging the rotor of a torque converter with a countershaft.

12. A power transmission mechanism according to claim 1, in which the direct drive means include a plurality of clutches, each to selectively engage a torque converter rotor with its impeller, and a plurality of clutches, each to selectively ground a torque converter stator to the transmission housing.

13. A power transmission mechanism according to claim 1, in which the direct drive means include a plurality of clutches, each to selectively engage a torque converter rotor with its impeller, a plurality of clutches, each to selectively ground a torque converter stator to the transmission housing, a gear train to which drive is transmitted from the rotors and a clutch for selectively engaging gearwheels of the gear train to transmit drive to the output shaft.

14. A power transmission mechanism according to claim 13, in which the means for drivingly engaging each countershaft with the output shaft in a hydraulic power path include said gear train and said clutch for selectively engaging gearwheels of the gear train to transmit drive to the output shaft.

15. A power transmission mechanism comprising an input shaft, an output shaft, a pinion shaft, a clutch for selectively engaging the pinion shaft with the input shaft in a mechanical power path, a plurality of countershafts in generally parallel alignment with the pinion shaft, a plurality of hydraulic torque converters, each mounted coaxially with a countershaft and each to operate simultaneously with the other torque converters, a clutch for selectively engaging the input shaft with each torque converter in a hydraulic power path, a plurality of one-way clutches, each for drivingly engaging in the hydraulic power path the rotor of a torque converter with a countershaft and for allowing the countershaft to overrun the torque converter, a gear train engaging the pinion shaft in the mechanical power path and the countershaft in the hydraulic power path, and a clutch for selectively engaging gearwheels of the gear train to transmit drive to the output shaft.

16. A power transmission mechanism having mechanical and hydraulic drive paths comprising an input shaft, an output shaft, a plurality of countershafts in generally parallel alignment, a plurality of hydraulic torque converters, each mounted coaxially with a countershaft and having an impeller drivingly engaged by the input shaft and a rotor drivingly engaging a countershaft, a plurality of clutches, each to selectively engage a torque converter rotor with its impeller in the mechanical drive path, a plurality of clutches, each to selectively ground a torque converter stator to the transmission housing, a gear train to which drive is transmitted from the countershafts, and a clutch for selectively engaging gearwheels of the gear train to transmit drive to the output shaft.